Patented Nov. 11, 1924.

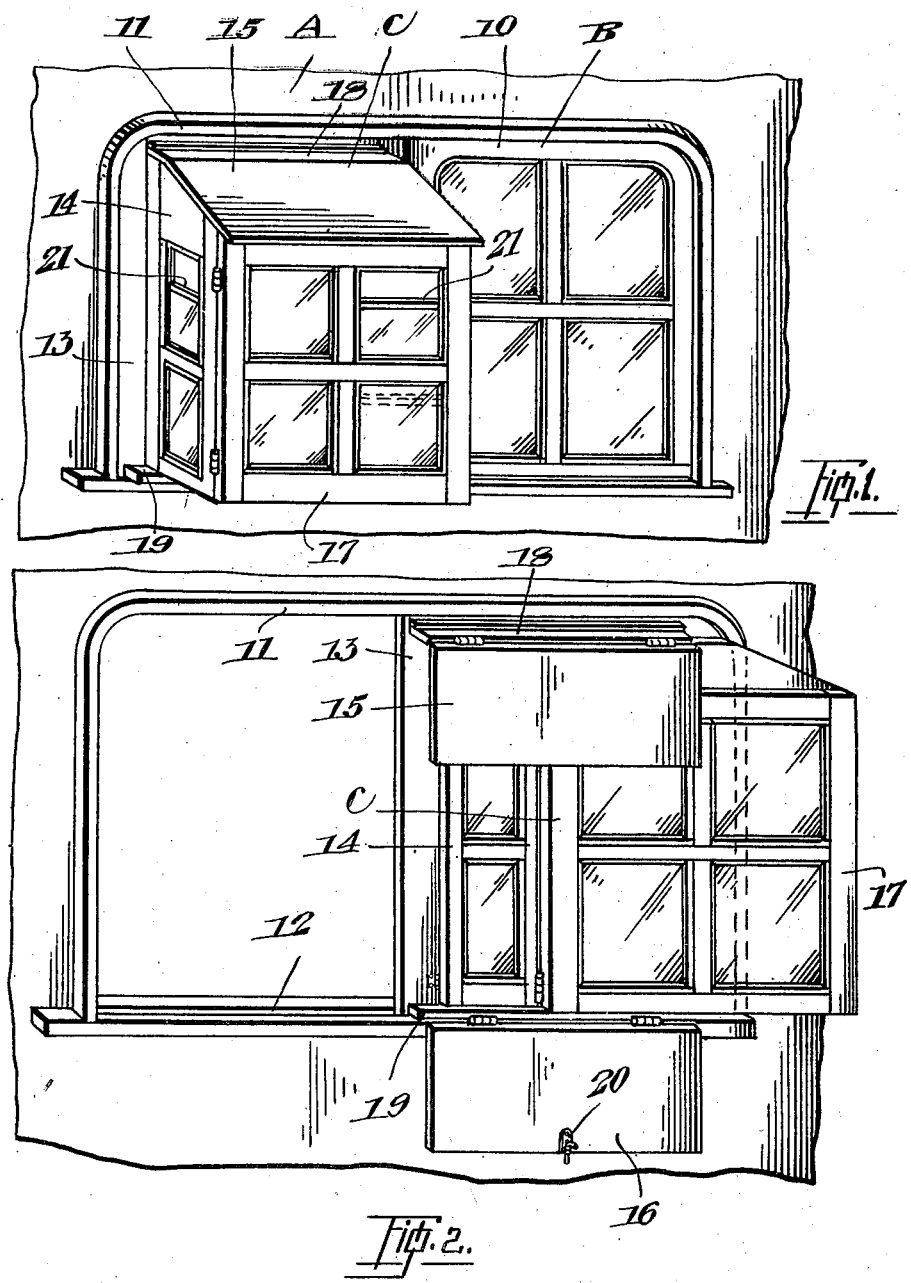

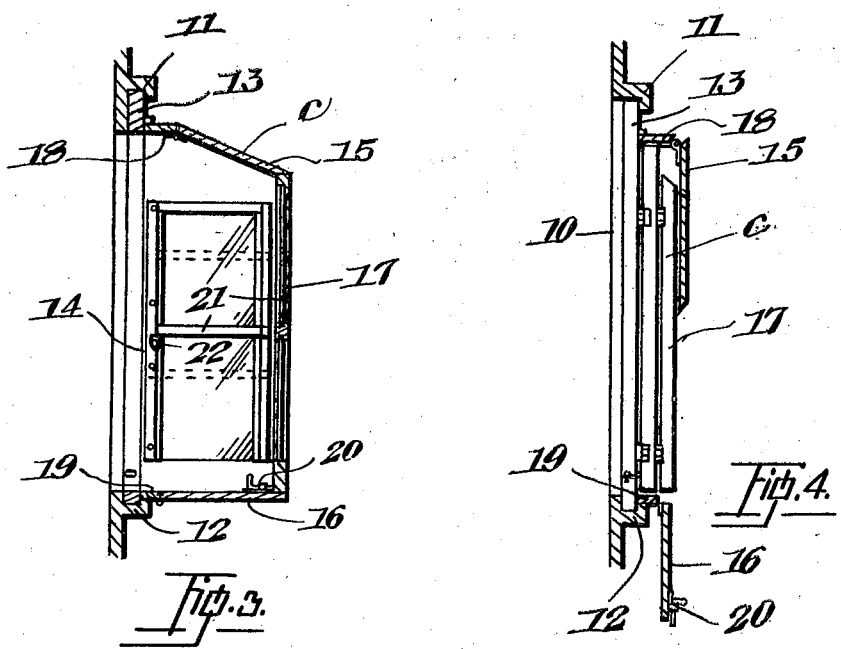
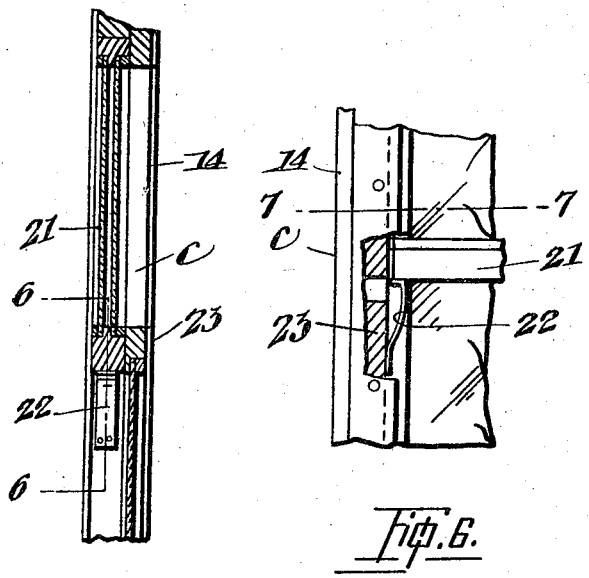
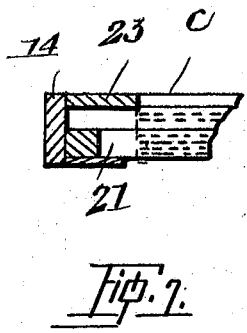

1,515,241

UNITED STATES PATENT OFFICE.

GABRIEL DAVID, OF SMITHS FALLS, ONTARIO, CANADA.

LOCOMOTIVE-CAB WINDOW.

Application filed March 13, 1922. Serial No. 543,452.

*To all whom it may concern:*

Be it known that I, GABRIEL DAVID, a subject of the King of Great Britain, and resident of the town of Smiths Falls, in the Province of Ontario and Dominion of Canada, have invented certain new and useful Improvements in Locomotive-Cab Windows, of which the following is a specification.

This invention relates to improvements in locomotive cab windows, and the objects of the invention are to provide a simple and effective device by means of which a view may be obtained on the track both forwardly and rearwardly without interference from the air passing the window.

It consists essentially of a collapsible window projecting laterally from the side of the locomotive engine, constructed and arranged as seen in detail in the accompanying specification and drawings.

In the drawings:

Figure 1 is a perspective view of the window in extended position.

Figure 2 is a perspective view of the window in collapsed position.

Figure 3 is a vertical sectional view of the window when extended.

Figure 4 is a sectional elevation of the window when collapsed.

Figure 5 is a sectional view through one of the end members of the window.

Figure 6 is a sectional detail on the line 6—6 of Figure 5.

Figure 7 is a section on the line 7—7 of Figure 6.

In the drawings, like characters of reference indicate corresponding parts in all the figures.

Referring to the drawings, A indicates the portion of a cab of a locomotive, and B the window frame thereof, and C my improved collapsible cab window.

The window frame is formed with the ordinary window 10 extending half-way across the same and on the outer side of this, guide-ways or tracks 11 and 12 are provided at the top and bottom designed to receive the frame 13 of my collapsible window, which is constituted by side members 14 hinged to the frame 13, a top member 15, a bottom member 16 and a front member 17.

The front member 17 is hinged to both of the sides 14, whereby both sides and front members may be free to swing laterally into collapsed position as shown in Figure 2.

The top member 15 is inclined when in use and is hinged to a projection or rail 18 on the frame 13, and is adapted to swing downwardly over the side and front members when collapsed.

The bottom member 16 is hinged to a rail 19 on the frame 13 and is adapted to swing upwardly between the lower extremity of the side and front members and so maintain them in extended position as shown in Figure 3 being itself adapted to be retained in such position by means of a suitable latch 20 mounted on the member 16 designed to engage a suitable recess in the lower extremity of the front member 17.

Both the front and side members are provided with windows, the upper portions of which are adapted to be raised and lowered.

Referring to Figures 5, 6 and 7, it will be seen that the upper sash 21 is designed to be retained in position by a spring retaining member 22 mounted on the frame 23 of the side member, this spring being adapted to be forced inwardly to permit the sash to be lowered.

It will be seen that the device is composed of few parts, which may be collapsed into compact form when not in use, and yet when in use permits the head of the engineer to be projected in advance of the side of the locomotive cab, whereby an unobstructed view forwardly and rearwardly may be obtained.

Although the invention is described as applied to a locomotive cab, it might readily be applied to a private car or other location where a lookout window is required.

As many changes could be made in the above construction, and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

A collapsible outlook window of the character described comprising a travelling frame, side panels hingedly connected with the frame and formed with sloping top ends, a front panel hingedly connected to each of the side panels, a roof member swingingly mounted on the frame and adapted to engage with the tops of the side panels, a base member swingingly mounted on the frame and retaining-latch carried by the base member and adapted to engage with a recess in the front panel to retain the base in position.

In witness whereof I have hereunto set my hand in the presence of one witness.

GABRIEL DAVID.

Witness:
RUSSEL S. SMART.